United States Patent [19]

Chan et al.

[11] Patent Number: 4,747,128

[45] Date of Patent: May 24, 1988

[54] TELEPHONE PRIVACY PROTECTOR

[76] Inventors: Kwok-Leung Chan, 33875 Juliet Cir., Freemont, Calif. 94536; Shiu-Pong Lee, 8533 Liman Way, Rohnert Park, Calif. 94928

[21] Appl. No.: 865,682

[22] Filed: May 22, 1986

[51] Int. Cl.⁴ .............................................. H04M 1/68
[52] U.S. Cl. ..................................... 379/194; 379/387
[58] Field of Search .............. 379/184, 387, 177, 168, 379/161, 7, 194; 340/825.5, 825.51

[56]  References Cited

U.S. PATENT DOCUMENTS

| | | | |
|---|---|---|---|
| 2,001,095 | 5/1935 | Deakin | 379/117 |
| 3,499,121 | 3/1970 | McIntosh et al. | 379/184 |
| 3,504,128 | 3/1970 | Steinman et al. | 379/184 |
| 3,514,544 | 5/1970 | Chambers, Jr. | 379/184 |
| 4,000,376 | 3/1975 | Springer | 379/184 |
| 4,039,759 | 8/1977 | Taylor | 379/168 |
| 4,169,217 | 9/1979 | Szanto et al. | 379/396 |
| 4,332,983 | 6/1982 | Vakill | 379/177 |

Primary Examiner—James L. Dwyer
Attorney, Agent, or Firm—Oltman and Flynn

[57] ABSTRACT

This invention is a telephone privacy protector to be interposed between a common exchange line and each one of at least two telephones sharing the line. The device includes a voice connecting circuit connected between a respective phone and the line; a control circuit operatively engaging the connecting circuit, and having an on- and an off-state, and a trigger having a threshold voltage responsive to the line voltage controllingly engaging the control circuit to trigger it into its on-state to provide a voice connection between the telephone and the common line in response to the line voltage exceeding said threshold voltage.

11 Claims, 4 Drawing Sheets

TELEPHONE PRIVACY PROTECTOR

BACKGROUND OF THE INVENTION

The invention relates to telephone systems and more particularly to a system for providing privacy between several telephones connected to a common telephone line. In addition, the invention also relates to home banking systems using a common telephone line.

In many residential and commercial telephone installations, a number of telephone instruments are sharing a common telephone line. In such installations, it is often impossible for one telephone user to know during conversation that another user connected to the line has gone off-hook and is listening to the conversation. The instant invention eliminates that problem, as described in more detail hereinbelow.

SUMMARY OF THE INVENTION

The telephone privacy protector ("TPP") according to the invention is comprised of active electrical components such as transistors, rectifiers, and zener diodes and inactive components such as resistors and capacitors.

The rectifiers are connected in the well-known four-way rectifier bridge configuration, having two ac-terminals and two dc-terminals. The bridge is connected with its two ac-terminals between each telephone instrument and the active telephone line T, and a control circuit is connected between the two dc-terminals, which controls the voice connection between the line and the telephone instrument by presenting an open or closed path between the dc-terminals and thereby provides a voice connection when the path is closed, and no connection when it is open.

The bridge assures that a voice connection can be provided, regardless of the polarity of the input from the telephone line.

In operation, a sudden change in voltage level across the telephone line caused by one of the telephones going off-hook, will generate a pulse coupled through a zener diode, that will turn on a latching transistor circuit, which will in turn provide the controlling path for the rectifier bridge, that will allow voice to pass through the bridge from the line to the telephone.

In general use, at least two telephones will be connected to a common telephone line, and a telephone privacy protector will be connected with each of the telephones. Assuming first that all telephones are on-hook and that a given telephone goes off-hook, the remaining telephones will be incapacitated as a result of the line voltage dropping below a given level for all the telephones including the privacy protector connected thereto. In this way a "first come, first served" operation is provided by the system.

In a preferred embodiment of the invention, the remaining telephones can be activated only when the given telephone goes back on-hook.

Furthermore, incoming and outgoing calls to and from any other one of the remaining telephones can only be transferred thereto by first going off-hook with only one of the desired telephones and then placing the occupied telephone back on-hook. Such transfer of a call can be repeated as often as desired. The system, in this operation will not disconnect the outside line, because the switching speed of the controlling transistors is so fast that a disconnect signal will not be generated.

In a further embodiment of the invention, a light indicator, advantageously in the form of a light-emitting diode ("LED") is connected to each privacy protector, which, by being lighted when the telephone is taken off-hook, indicates that no conversation is in progress, and conversely, by staying dark indicates that conversation is in progress between the line and one of the other telephones.

With this embodiment, in case a lighted LED suddenly goes dark during conversation, the telephone user will know therefrom that an intruding party has by-passed the privacy arrangement and may be listening to the conversation.

In a still further embodiment, a by-pass pushbutton is provided with each privacy protector, which can be operated by a user. In case an intruding party has intentionally by-passed the privacy arrangement, which is indicated by above LED going dark, the user can push and hold the by-pass push-button to request the intruding party to go off the line.

The by-pass pushbutton has two functions, thus, it also serves the important purpose of enabling a party who is not using his telephone to gain access to the line, even if busy, for example in an emergency. In such case the intruding party can request another party to relinquish the line.

In the preferred embodiments the privacy protector requires no local voltage supply, but the small amount of power required from the telephone during conversation.

It follows that since the protector is connected in series with the telephone, the increase in input impedance of the telephone will reduce the overall current consumption.

Other objects of this invention will appear from the following description and appended claims, reference being had to the accompanying drawings forming a part of this specification wherein like reference characters designate corresponding parts in the several views.

Briefly summarized, the privacy protector provides privacy for any telephone user of a plurality of users sharing a common telephone line. It further provides a by-pass pushbutton, that enables anyone of the other users to intrude into an established conversation, e.g. if the line is needed in an emergency. It further provides a light indicator at each telephone which indicates, by going into lighted state, when the first user of the line goes off-hook, that he has made connection to the line. Conversely, the light indicator, by staying dark, when a user goes off-hook, indicates that the line is in use, and therefore not available to a new user. The light indicator further shows, by going dark during conversation, that an intruding party is using his by-pass pushbutton, and may be listening.

The invention has the important advantage that it does not require an external power source, but draws a small amount of power directly from the line being used.

On incoming calls, any telephone connected to the line can canswer the call, and the call can be transferred from one user to another without disconnecting the line.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DESCRIPTION OF THE PREFERRED EMBODIMENTS

Figure 1:
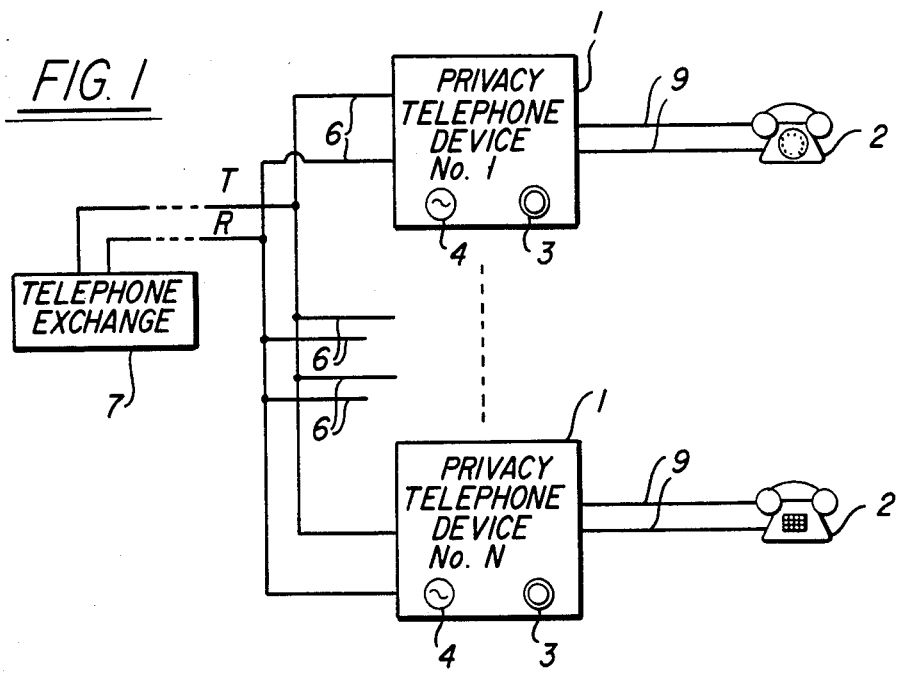
FIG. 1 is a simplified block diagram of a telephone system according to the invention, including a plurality of telephones, each connected through the privacy protector to a common telephone line and a telephone exchange.

FIG. 1 shows a plurality (N) of telephones 2, each connected through a corresponding telephone privacy protector 1 through a common telephone line 6 to a telephone exchange 7.

Each telephone 2 may be of any suitable conventional type of construction including rotary dialling or tone dialling, as indicated for the lower telephone in the figure.

The exchange 7 may be of any conventional type switching system such as a public main telephone exchange (MX) or a private branch exchange, with the only restriction that a common two-wire connection is provided consisting of a tip and ring conductor (T and R) of which the tip conductor T usually is returned to ground potential and the ring conductor R is returned to negative exchange battery potential, typically −48 to −52 volts at the exchange.

Each telephone privacy protector 1 is shown as having a privacy light indicator 4, indicating in lighted condition that a telephone connection has been established between the exchange 7 and the telephone 2 through the privacy protector 1. Only the one privacy protector 1, which is actively engaged in conversation shows a lighted privacy light 4, while the lights on the remaining privacy protectors remain dark during conversation. A by-pass button 3 on each privacy protector may serve to gain access to a line in use by another party for a telephone user having an urgent need for gaining access to a busy line, as explained in more detail hereinbelow.

Figure 2:
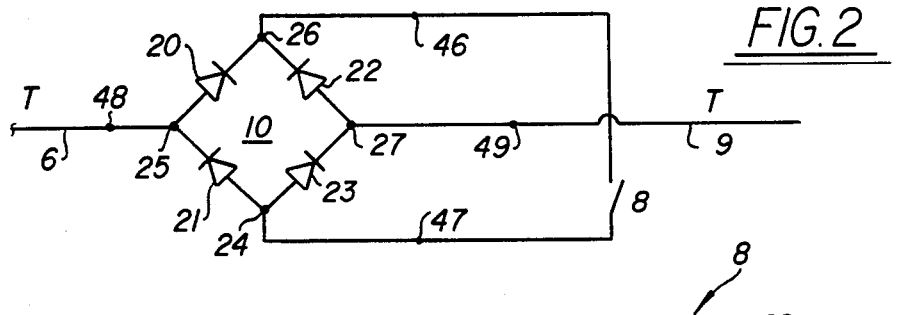
FIG. 2 is a circuit diagram of a four-way rectifier bridge, used as the basic connecting circuit.

FIG. 2 shows a rectifier bridge 10 which is the basic line connecting circuit used for connecting or disconnecting the conversation between the common line 6 and the single line 9 to the telephone 2. The individual line 9 connects the phone 2 with its associated privacy protector 1, through a tip and a ring conductor, which are connected to the rectifier junctions 25 and 27 respectively. A symbolic controlling switch 8 is shown connected between the two other junctions 24 and 26 of the bridge 10. When the switch 8 is open, as shown, no voice transmission can be conducted between lines 6 and 9. If the switch 8, however, is closed, dc-current, with voice superimposed thereon will flow in the direction from terminal 48, through junction 25, forward biased rectifier 20, junction 26, terminal 46, switch 8, terminal 47, junction 24, forward biased rectifier 23, junction 27, and terminal 49 to line 9.

If the direction of flow of the dc current is reversed, rectifier 20 and 23 will become reverse biased, and rectifiers 22 and 21 will become forward biased and conducting.

It is to be understood that the choice of a four-way rectifier bridge 10 is only examplary and that other forms of switches based on solid state components can be constructed of components such as transistors, thyristors and the like. It is also to be understood that the switch 8 typically is not a mechanical switch as indicated, but will preferably be a form of a solid-state switch, as described in more detail hereinbelow.

Figure 3:
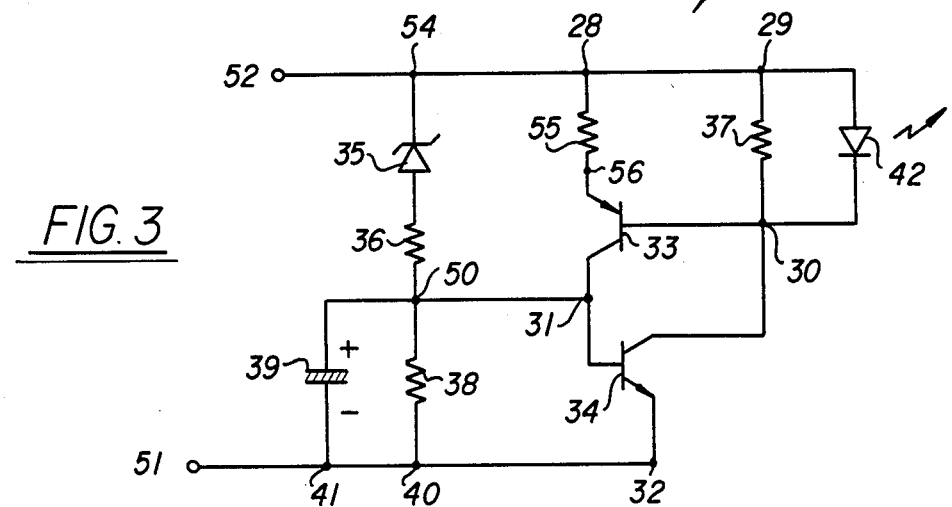
FIG. 3 is a circuit diagram of a control circuit for controlling the connecting circuit.

FIG. 3 shows a solid-state control circuit usable as the switch 8 in FIG. 2. The control circuit includes a latching part comprised of the complementary transistors 33 and 34, connected as a so-called flip-flip, which have a latched ("on") state in which both transistors maintain each other in conducting state with current flowing therethrough from terminal 52 to 51, and a non-latched state, in which both transistors maintain each other in open condition, allowing no current flow therethrough.

Figure 6:
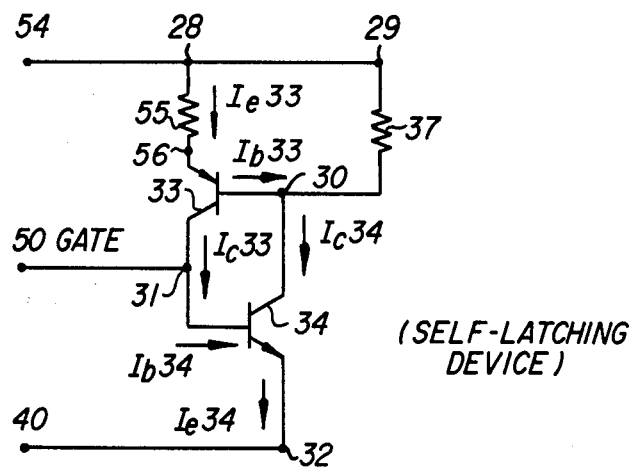
FIG. 6 is a circuit diagram showing the current flow through the control circuit of FIGS. 4 and 5.

In the latched condition, current flows as seen in FIG. 6, entering at terminal 54, flows through resistor 55 as current Ie 33, through the emitter of transistor 33, branches from there into currents Ib 33 and Ic 33. The latter flows through the base of transistor 34 as Ib 34 and maintains transistor 34 in conducting state. Current branch Ib 33 flows into the collector of transistor 34 and maintains transistor 33 conducting. In the unlatched ("off") state no current flows in either transistor base, and they are therefore maintaining each other in the non-conducting off-state.

In the off-state a momentary trigger pulse, applied to terminal 50 with a positive potential in reference to terminal 40, will drive a trigger current Ib 34 into the base of transistor 34, which goes into conduction, and as such starts to draw base current Ib 33 from the base of transistor 33. After the pulse is removed, the two transistors 33 and 34 maintain each other in conducting state as described hereinabove.

Returning now to FIG. 4, it is clearly seen that the two transistors 33 and 34 in series with current limiting emitter resistor 55, in the on-state act as a closed switch 8, and enable voice to flow between terminals 48 and 49.

The self-latching complementary transistor circuit formed of the transistors 33 and 34 described hereinabove has the advantage that in the off-state no current flows through the circuit, while in the on-state, it represents a relatively low reistance value. The resistors 55 and 37 serve to maintain voltage drops that are beneficial for maintaining stable on or off states for the circuit.

Figure 4:
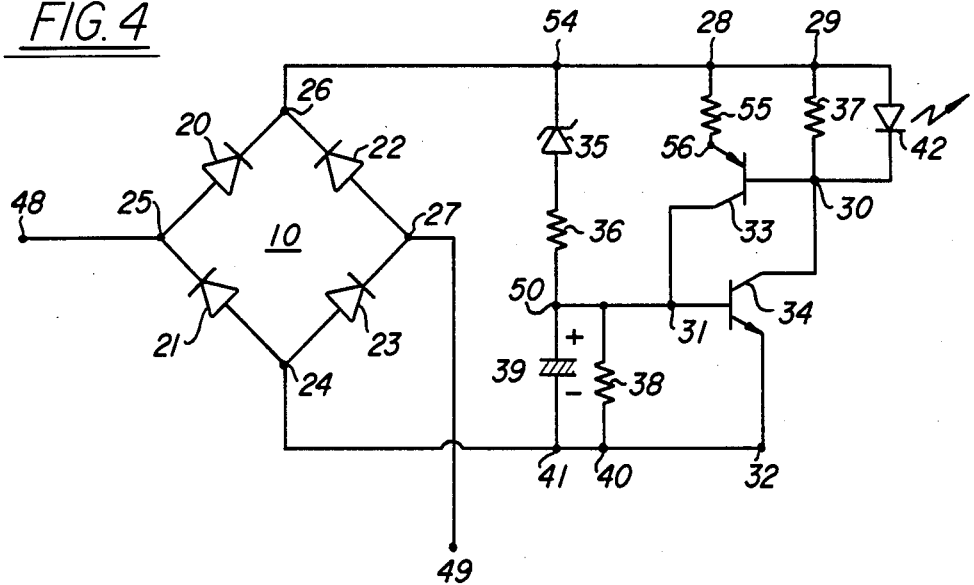
FIG. 4 is a circuit diagram of the rectifier bridge combined with the light indicator.

FIG. 4 further shows a light indicator 42, incorporated into the control circuit and advantageously being a light emitting diode, which is inserted in forward biased condition from terminal 29 to the base of transistor 33. When the control circuit is in its on-state, the light indicator 42 draws part of the current through the circuit and emits light indicating an on-state.

A trigger circuit for triggering-on the control circuit is provided, which includes a first zener diode 35 in series with current limiting resistor 36 and the parallel combination of capacitor 39 and resistor 38.

The trigger circuit operates to trigger the latching circuit when a positive potential pulse referenced to terminal 40 is applied to terminal 54, having a potential value exceeding the zener voltage of zener diode 35. In that case current flows through the zener diode 35 from terminal 54, through resistor 36 to the base of transistor 34, which turns on, and in turn, turns on the transistor 33, as explained hereinabove. The capacitor 39 serves to filter out spurious noise pulses that could trigger the circuit on. The zener diode 35 typically has a zener voltage of 24 volts, but will operate within a relatively wide range of voltages. The capacitor 39 is typically an electrolytic capacitor in the range from 2–10 micro farads.

Figure 5:
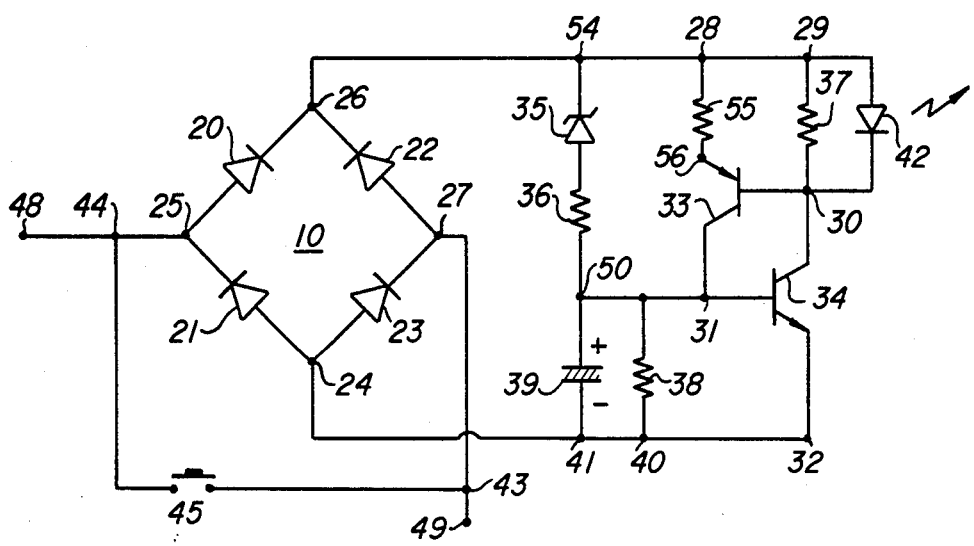
FIG. 5 is a circuit diagram of the rectifier bridge and control of FIG. 4 combined with a privacy by-pass button.

A by-pass non-locking pushbutton 45 is seen added in FIG. 5. The pushbutton 45 when depressed, operates to bypass the rectifier bridge 10 so that a person at a non-talking telephone with a privacy protector in the off-state, by operating the pushbutton can override the device and talk to the person already having an established conversation on his telephone. The intruding person must maintain his pushbutton operated during this intruding conversation.

The person being intruded upon will see that his light indicator will go dark during the intrusion period, due to the fact that the intruding party in having short-circuited his privacy protector with the metallic contacts in the pushbutton will be diverting from the intruded-upon part the greater part of the shared line current from the exchange, while the intruded-upon party has in his branch the lesser part of the shared current which is being limited by the limiting resistor 55 in his privacy protector mentioned briefly hereinabove.

In other words, upon intrusion, the intruding party will draw the major part of the shared line current away from the intruded-upon party, since the current of the former is limited by metallic contacts, and that of the latter is limited by the current limiting resistor 55.

Figure 7:
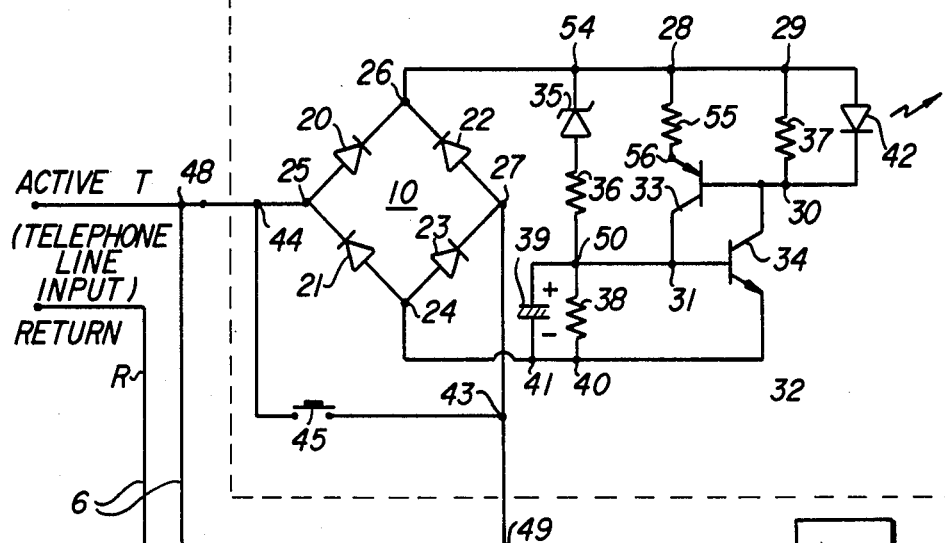
FIG. 7 is a circuit diagram showing two telephones each connected through a privacy protector to the telephone line.
Figure 7:
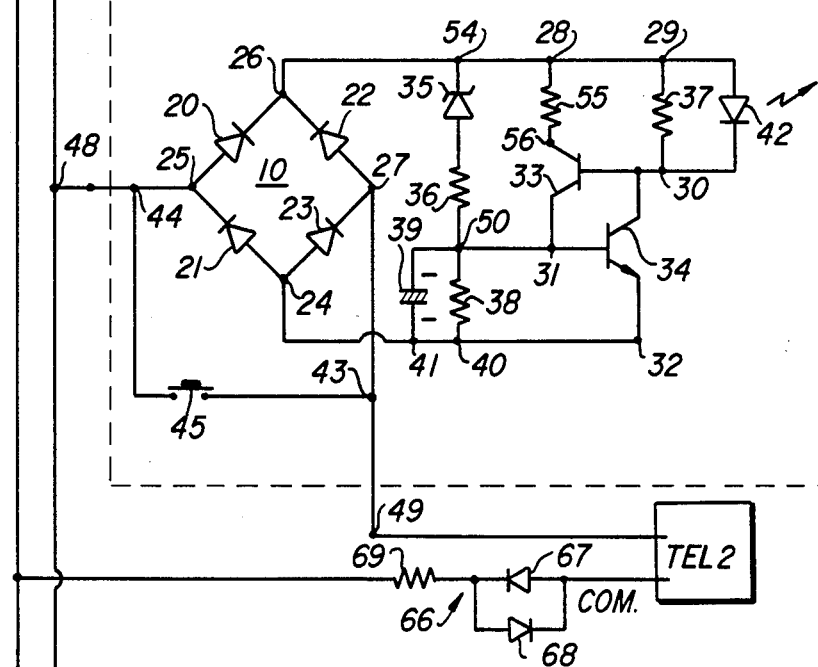

FIG. 7 shows a circuit diagram of two telephones, (TEL 1 and TEL 2), each having a respective privacy protector TPP #1 and TTP #2.

The tip side T of the common telephone line 6 is indicated as the active side conductor in which the privacy device is inserted and ring side R is the return conductor, as indicated. It follows that either side can be tip or ring conductor.

In operation, describing first and incoming call, the return conductor R has a ringing signal applied thereto by the telephone exchange. The ringing voltage is an ac-voltage typically in the range from 50 to 100 volts RMS. Both or one of the telephones TEL 1 and TEL 2 will have a ringer connected across the two sides of the line. The ringing voltage will flow through the rectifier bridge 10, and through the latching complementary transistor circuit forming the control circuit, which will be triggered on by the ringing voltage and allow the ringer in the telephones to ring. When one of the phones is answered by going off-hook and thereby bridges the telephone line, the off-hook condition is detected by an off-hook detector at the exchange, which will disconnect ringing voltage and provide a steady dc talking voltage to the answering telephone.

During the off-hook condition the dc-talking voltage across the line will drop to a relatively low dc-voltage, typicaly in the range 10–20 volts, depending upon the line resistance to the exchange and the total resistance in the answering phone and the privacy protector connected between the telephone and the line.

Assuming that telephone TEL 1 answered the ringing and is talking and telephone TEL 2 subsequently goes off-hook to initiate a call, the person at TEL 2 will first note that his light indicator 42 stays dark and he will hear nothing since privacy protector TPP #2 is in the off-state and will remain so, since the line voltage now is too low to overcome the zener voltage of the zener 35. He can enter the conversation by operating the by-pass pushbutton 45, but the first conversing party will note that his light indicator 42 will darken.

On outgoing calls, the first person going off-hook will receive dial tone, because his telephone bridging the telephone line will trigger the latching circuit, since the exchange voltage on the line at this time is high enough to overcome the zener voltage of zener 35. Thereafter, the line voltage goes low, being bridged by the talking telephone, and another party on the same line with a privacy protector going off-hook will not be connected since the line voltage is now too low to overcome the zener voltage of the zener diode 35, and trigger the control circuit into its on-state.

The moment the talking party goes on-hook, in case another party is off-hook at the moment, the line voltage will momentarily rise and trigger on the control circuit of the other party, who can then continue the conversation while the first party's latching circuit will be reset to its off-state. When the last party goes on-hook, the line current will be disconnected, and the latching circuit of the last party will be reset to its off-state. In this way, a conversation can be transferred from one party to another an unlimited number of times.

In still another embodiment, a balancing network 66 is included in the side of the telephone line opposite the privacy protector.

The balancing network 66 insures a high degree of longitudinal line balance for suppression of noise and interference. The balancing network includes two rectifiers 67, 68 in antiparallel connection, connected in series with a resistor 69 typically in the range from 5–10 ohms. The rectifiers 67,68 are advantageously of the same type as the rectifiers used in the connecting circuit 10.

We claim:

1. Telephone privacy protector to be interposed between a common exchange line and each one of at least two telephones sharing the line, the privacy protector comprising: a voice connecting circuit connected between a respective phone and the line; a control circuit, having a self-latching complementary transistor circuit, operatively engaging the connecting circuit, having an on- and an off-state, trigger means having a threshold voltage responsive to the line voltage controllingly engaging the control circuit to trigger it into its on-state to provide a voice connection between the telephone and the common line in response to the line voltage exceeding said threshold votlage; a privacy by-pass pushbutton for by-passing said connecting circuit; and a light indicator in series connection with said control circuit for visually indicating a privacy by-pass condition.

2. Telephone privacy protector according to claim 1 wherein said connecting circuit includes at least one four-way rectifier bridge having two opposite pairs of rectifier junctions, having one pair of junctions connected in one side of the line between the common exchange and the telephone served by the respective privacy protector and the other pair of junctions connected to the control circuit.

3. Telephone privacy protector according to claim 2, wherein said control circuit includes a latching circuit having a trigger input and two complementary latchingly interconnected transistors, said trigger means having a zener diode in series connection with the line voltage, having a given zener voltage being substantially equal to said threshold voltage connected to the trigger input, for triggering said latching circuit into its on-state.

4. Telephone privacy protector according to claim 1, wherein said privacy by-pass pushbutton for by-passing said connecting circuit in its non-connecting state has a pair of make contacts shortingly connected across said connecting circuit, for shorting said connecting circuit during privacy override.

5. Telephone privacy protector according to claim 3, wherein said privacy by-pass pushbutton for by-passing said connecting circuit in its non-connecting state has a pair of make contacts shortingly connected across said connecting circuit, for shorting said connecting circuit during privacy override.

6. Telephone privacy protector according to claim 1, wherein said light indicator is a light emitting diode.

7. Telephone privacy protector according to claim 2, including a current limiting resistor in series connection with said control circuit for limiting the current therethrough in its on-state.

8. Telephone privacy protector according to claim 1, including a line balancing network inserted in the line side opposite the privacy protector.

9. Telephone privacy protector according to claim 8, wherein the balancing network includes two antiparallel rectifiers in series connection with a resistor.

10. Telephone privacy protector according to claim 3, including a latching circuit comprised of fast switching transistors to ensure that a disconnect signal will not be generated.

11. Telephone privacy protector according to claim 3, including a latching circuit comprised of transistors each having a noise figure less than 10 dB below that of silicon-controlled rectifiers and thyristors.

* * * * *